United States Patent [19]
Baisch et al.

[11] Patent Number: 5,556,050
[45] Date of Patent: Sep. 17, 1996

[54] VARIABLE CLICK MECHANISM FOR LEVER DRAG REEL

[75] Inventors: Eric K. Baisch; Leroy G. Blimegger, both of Philadelphia, Pa.

[73] Assignee: Penn Fishing Tackle Manufacturing Co., Philadelphia, Pa.

[21] Appl. No.: 207,409

[22] Filed: Mar. 7, 1994

[51] Int. Cl.⁶ ............................................. A01K 89/033
[52] U.S. Cl. .................................................... 242/296
[58] Field of Search ................................ 242/296, 306, 242/307

[56] References Cited

U.S. PATENT DOCUMENTS

| | | | |
|---|---|---|---|
| 2,116,581 | 5/1938 | Moor | 242/296 |
| 2,489,457 | 11/1949 | Maerk | 242/296 |
| 3,827,649 | 8/1974 | Payen | 242/296 |
| 4,540,135 | 9/1985 | Uetsuki et al. | 242/296 |

*Primary Examiner*—Katherine Matecki
*Attorney, Agent, or Firm*—Frank Benasutti

[57] ABSTRACT

A fishing reel click mechanism is disclosed which exerts a variable drag on the spool as well as producing a variable click.

14 Claims, 10 Drawing Sheets

5,556,050

VARIABLE CLICK MECHANISM FOR LEVER DRAG REEL

TECHNICAL FIELD

This invention relates generally to fishing reel mechanisms and more particularly to mechanisms which make a noise and resist spool rotation when the line is played out from a fishing reel spool.

BACKGROUND ART

In the prior art, deep-sea fishing devices known as lever drag or trolling reels included noise-making devices which could be set to make a noise when the line was played out from the spool of the reel. An essential secondary effect of the click mechanism was that it provided resistance which served to protect the angler from an over-run, a condition where the reel turns without line leaving the spool resulting in a hopeless tangle of line on the reel and usually a lost fish. Typically, fishermen using this type of reel have a number of rods and reels with baits attached to the lines; and troll, drift, or anchor for fish. When a fish takes a bait, it pulls line from the reel, thereby turning the spool. Distractions may interfere with the angler's ability to notice that a fish has taken a bait, and that line is being taken from the reel. By engaging the noise-making device, known as the "click" mechanism or simply the "click", the fisherman would be able to tell when and from which reel line was being played; because of the noise created by the clicker. These devices had "on/off" positions, such that, in the "off" position the noise maker was not engaged with the ratchet mounted to the spool, and the line could freely and silently be taken from the spool. In the "on" position, when line was pulled from the spool, the noise-maker would make noise. It would also impose a slight amount of drag on the spool. When a fisherman had the need for additional drag to hold a heavy bait or a large bait with lots of drag resistance in a strong current, yet did not want a steady drag on the spool once his bait was taken, he would wedge rigid foam between the line on the spool and the reel frame. When a fish would strike the bait, the foam would pop out and resistance on the line would decrease to the minimal amount provided by the click (enough, hopefully, to prevent overrun). Needless to say this use of foam is a patch job; for want of a better click mechanism.

Such devices are shown, for example, in U.S. Pat. No. 3,630,166 issued to Franklin D. Riddle et al on Dec. 28, 1971 and are generally known as "clickers". In that patent, a rotary plate 14 has an annular row of relatively shallow dimples or recesses 15 which coact with a clicker element or pin 16 to produce the desired clicking sound to alert the fisherman that the fish had swallowed the bait and was running with the line. See FIGS. 5 and 6. Adjustability of the click is desirable as it is useful to vary the noise and resistance which the click creates; as well as to to turn the click on and off. The prior art includes many different ways of adjusting various types of click mechanisms, but no prior art describes a click which has the versatility necessary for a big game trolling reel. The prior art devices can be grouped into just two categories. All clicks contain a moving notched member (ratchet) which interacts with a stationary member (click). The first category of adjustable clickers have a common adjustment in that the action of the mechanism is adjusted by the position of the click in relation to the ratchet. Prior art which fits into this category includes: U.S. Pat. No. 2,116,581 issued to E. N. Moor on May 10, 1938; U.S. Pat. No. 330,811 issued to J. Vom Hofe on Nov. 17, 1885; and U.S. Pat. No. 3,630,166 issued to F. D. Riddle et al. on Dec. 28, 1971.

A second category of adjustable clicker has a common adjustment in that the position in which the click is attached in relation to the ratchet is constant, but the force which urges the click into contact with the ratchet is varied. No means is provided for quickly turning the click "on" or "off". Prior art which fits into this category includes: U.S. Pat. No. 2,489,457 issued to M. Maerk on Nov. 29, 1949 and U.S. Pat. No. 3,827,649 issued to J. N. Payen on Aug. 6, 1974.

The click pawl device shown in U.S. Pat. No. 3,827,649 discloses a device for adjusting the braking force and noise in such a device.

SUMMARY OF INVENTION

Our invention concerns providing an improvement in a particular class of reel, known as a lever drag reel or a big game trolling reel, which has a known prior art clicking mechanism shown in FIGS. 1 through 3. In order to increase the usefulness of the reel it is our desire to increase the versatility of the click mechanism by adding the ability to adjust the strength of the click to the ability to turn the click "on" or "off". It is our desire to make this mechanism variable in order to serve several purposes. The first is to adjust the amount of force in the "on" position required to start the line off the spool while the reel is in free spool. We provide for multiple settings to allow more flexibility in fishing with the reel. The ability to adjust the strength of the click will allow more flexibility in fishing with the reel. A low setting will allow unweighted free floating baits fished in free spool to be taken without a fish feeling resistance, while still providing enough spool breaking to prevent serious overrun.

A higher setting provides more breaking to enable very large or weighted baits to be fished in free spool with the least amount of resistance possible felt by the fish, thus eliminating the need to use a foam wedge as previously described. In one embodiment, an infinite number of click settings are possible between the lowest and highest click settings.

The second function of our variable click mechanism is to serve as a warning device to alert the fisherman when the fish takes the bait. The intensity of the alarm can be adjusted to accommodate different fishing conditions. By intensity, we mean that the device makes a louder sound when more force is applied to it.

In the prior art, lever drag reels were used for big game fishing to vary drag force on the line by means of a lever. For example, an eighty pound line an angler may apply 0 to 25 or more pounds of drag force.

With the use of our invention, at or about 0 drag force being applied by the lever, the click mechanism can serve to apply a couple of ounces to 1½ to 2 pounds of force to the line and alert the fishermen that the fish has taken the bait. Thereafter, the fishermen may move the lever to a higher setting in order to set the hook.

Our click mechanism is thus variable (adjustable) in two ways. The click can be quickly brought into and out of contact with the ratchet with a flick of a lever and the spring force which acts to keep the click in position can be varied independently as well. Thus our click mechanism is novel in that it allows adjustability and uses not previously found in a single mechanism. The importance of this ability may not be recognized by the average fisherman, but is readily apparent to the big game fisherman. Large fish and the open ocean put added requirements on big game tackle.

Furthermore, the addition of a spring force adjustment to the prior art device represents a much needed improvement which will increase the usefulness of the click mechanism.

DISCLOSURE OF THE INVENTION

BRIEF DESCRIPTION OF DRAWINGS

FIG. 9b is an end view of the part shown in FIG. 9a.

DESCRIPTION OF THE PREFERRED EMBODIMENTS

Figure 2:
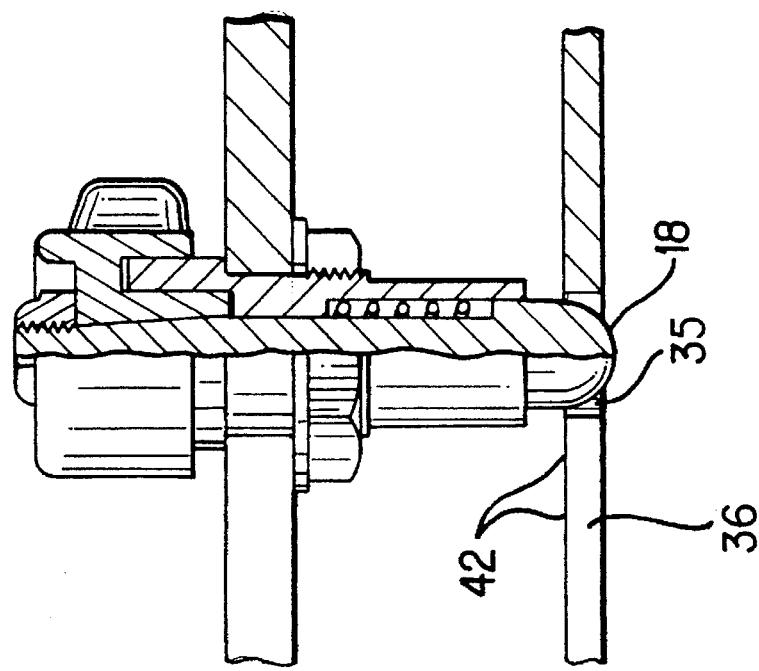
FIG. 2 is a view similar to FIG. 1 with the parts shown in an alternate position.
Figure 1:
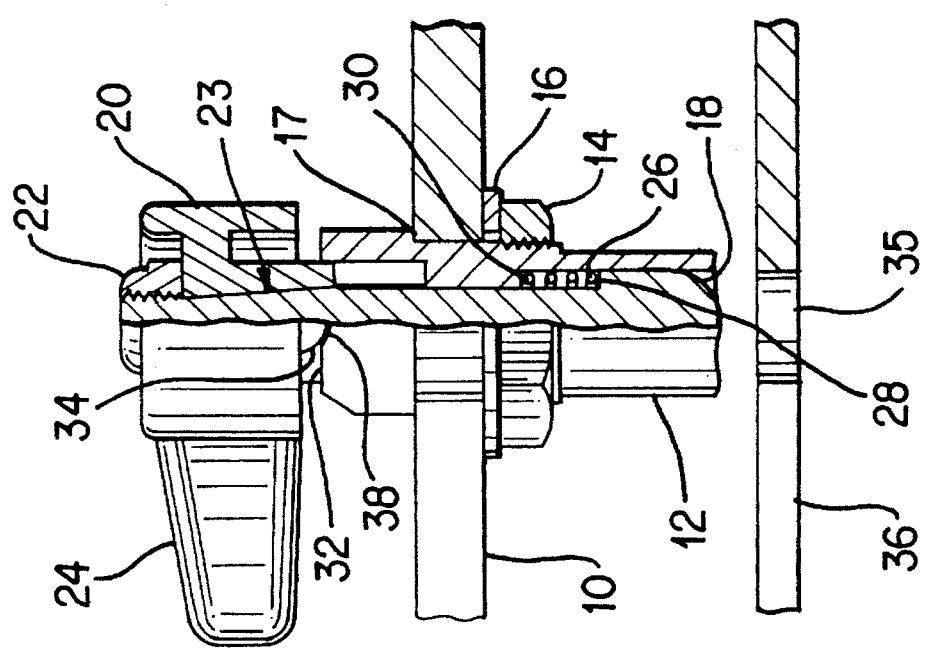
FIG. 1 is an elevation in partial vertical section and partially broken away of a device known in the prior art shown mounted in its environment.
Figure 3:
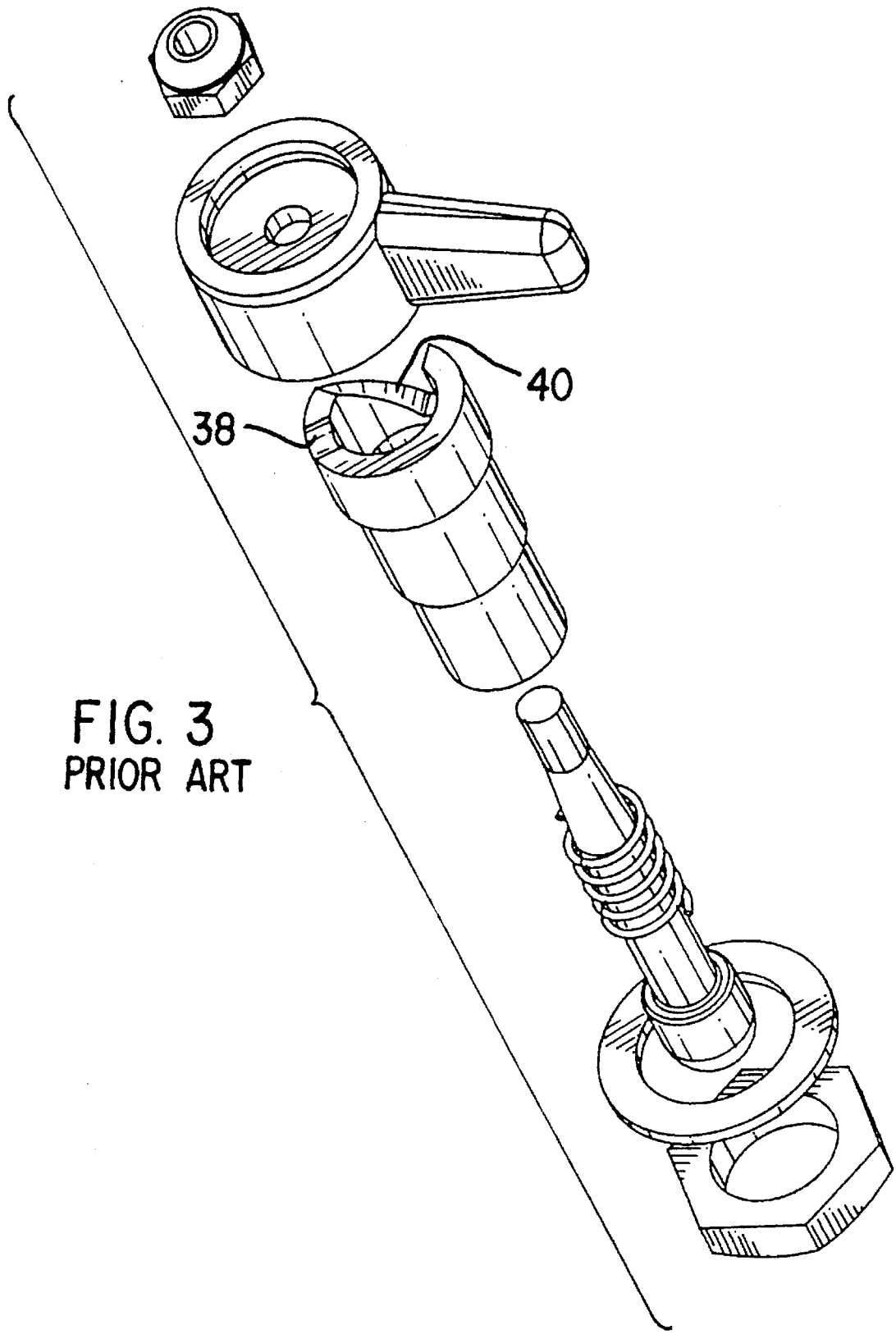
FIG. 3 is an exploded perspective view of the device shown in FIGS. 1 and 2.

Referring to the Figures, a prior device is shown FIGS. 1 through 3 wherein the side plate 10 of a reel is shown partially broken away and partially in section. Mounted through the side plate is a tongue bushing 12 which is retained therein by a nut 14 (and lock washer 16) threaded onto the tongue bushing and forcing the shoulder 17 of the tongue bushing into engagement with the side plate 10.

The tongue 18 is mounted in the bushing for sliding engagement therewith and is retained therein by a button 20 through which it passes and a lock nut 22 threaded onto the end of the tongue. When the lock nut 22 is drawn up tight, the tapered surfaces designated generally 23 of the tongue 18 and the button 20 mate.

Extending from the button 20 is a lever arm 24 which is used to rotate the button (the operation of which will be disclosed more fully herein after).

A spring 26 is provided within the tongue bushing engaging the shoulder 28 of the tongue 18 at one end and the shoulder 30 of the tongue bushing 12 at the other end. The spring is normally under compressive forces exerted therebetween which would normally cause the tongue 18 to move from the position shown in FIG. 1 to the position shown in FIG. 2. In the position shown in FIG. 2, the leading end of the tongue 18 engages slot 35 in ratchet 36.

The tongue bushing 12 has an upper cam surface 32. Riding on this cam surface is a follower 34 which normally is an integral part of the button 20. As shown in prior art FIG. 1, the cam follower is in the first detent 38 (shown in perspective view in FIG. 3) which retains the tongue 18 in a position which is out of engagement with the ratchet 36.

When the button 20 is rotated by means of manually engaging the lever arm 24 and pushing it so that it is in the position shown in FIG. 2, the cam 34 follows the surface 32 and drops into the detent 40 (shown in perspective view in FIG. 3) so that the entire button and tongue mechanism travels inwardly into the fishing spool mechanism (not shown, but conventional per se) to a position wherein the leading end of the tongue 18 engages the slot 35 as aforesaid (see FIG. 2). The mechanism is retained in that position until it is rotated out of that position by manual pressure.

The prior device thus had two positions: the "off" position (shown in FIG. 1) wherein the tongue was not in engagement with the ratchet; and the "on" position (shown in FIG. 2) wherein the leading end of the tongue 18 was in engagement with the ratchet 36. In this latter position, when line was being dragged off the reel, such as when a fish took the bait, the reel would turn and the tongue 18 would be cammed out of the slot 35 and ride along the surface 42 of the ratchet 36 until it reached the next slot; which it would click into under the action of the spring 26. In doing so, it would make a clicking noise, to alert the fisherman that a fish had taken the bait.

Figure 4:
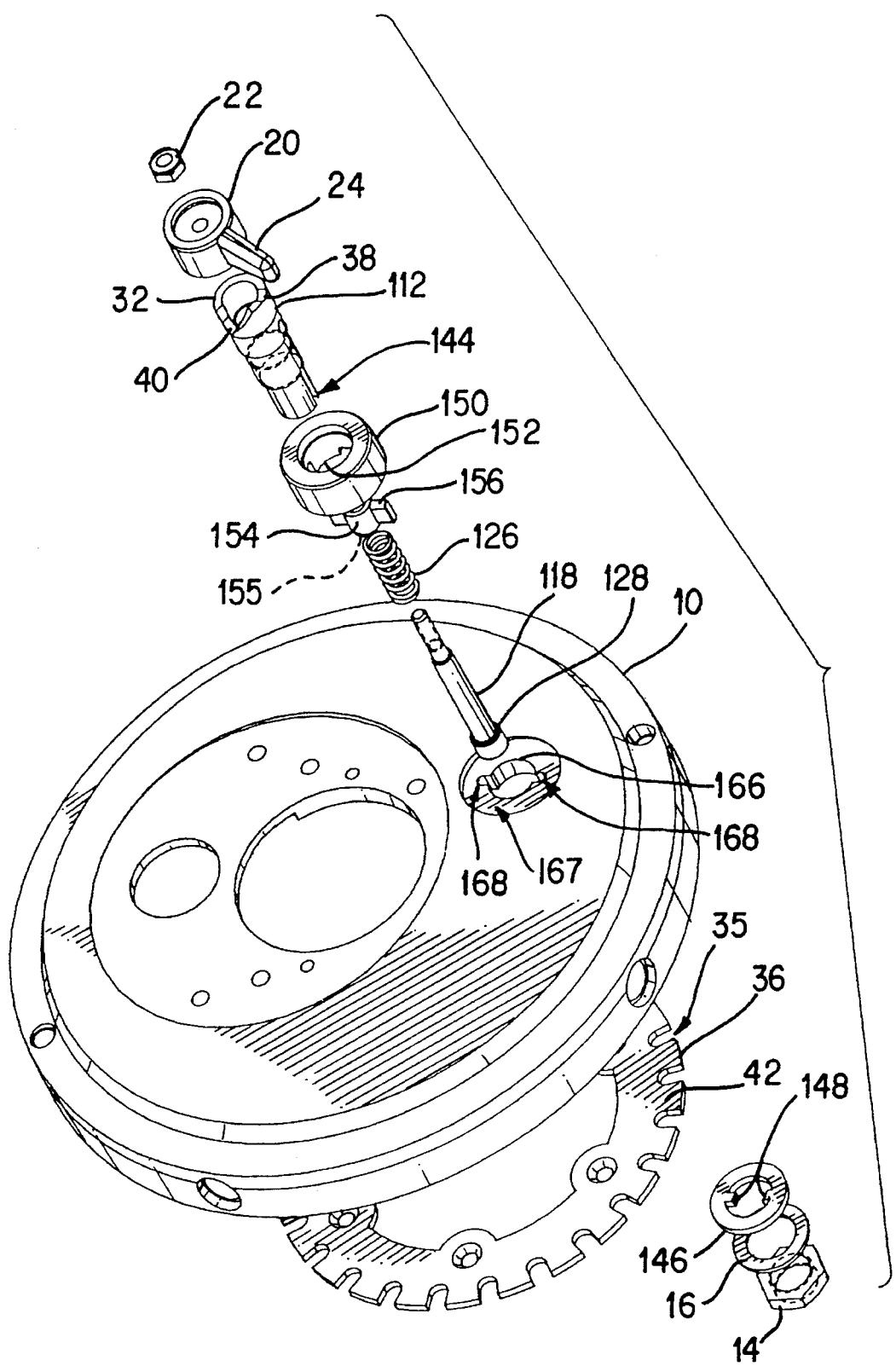
FIG. 4 is an exploded perspective view of one embodiment of our invention.
Figure 6:
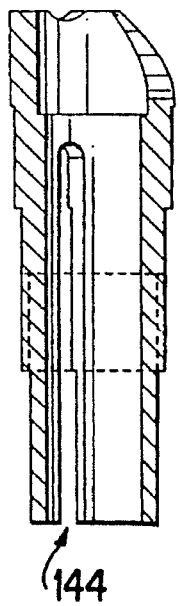
FIG. 6 is a section taken as indicated by the lines and arrows A—A in FIG. 5.
Figure 5:
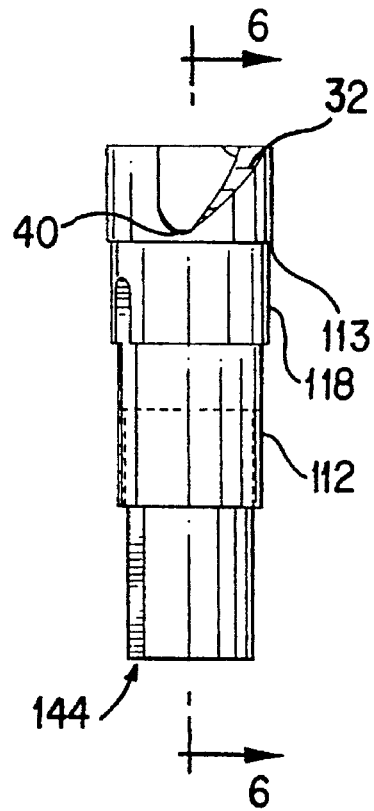
FIG. 5 is an enlarged reoriented elevation of one of the parts of our invention shown in FIG. 4.
Figure 7:
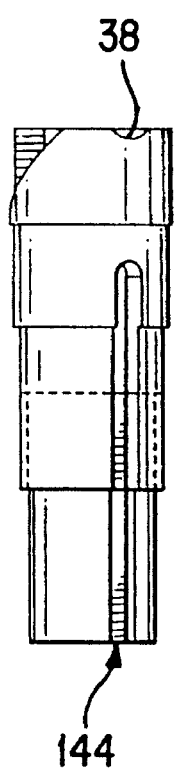
FIG. 7 is an elevation of the part shown in FIG. 5 taken from another side.
Figure 8:
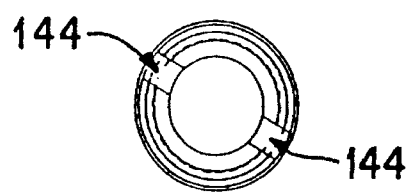
FIG. 8 is a bottom view of the part shown in FIG. 5.

Referring to the Figures, FIG. 4 and the remaining Figures show some parts which are the same as those in the prior art and in those cases, the same parts are designated with the same numbers. Otherwise, the other parts have received different numbers than those shown in prior art FIGS. 1 through 3.

Referring to FIG. 4, the side plate 10 has a hole 166 passing therethrough for reception of a portion of the variable click mechanism in accordance with our invention. Depicted below the side plate, in a position which, in operation, would be within the housing of the reel, is the ratchet plate 36 which has a number of notches, such as that designated generally 35, in its periphery.

The tongue bushing 112 passes through the clearance hole 166 and is retained against the side plate by the same threaded arrangement described with respect to the prior art.

However, in this embodiment, an additional eared lock washer 146 is provided with inwardly depending ears 148 which mate with slots designated generally 144 in the bushing (see also FIGS. 5 through 8). By this arrangement, when the nut 14 is threaded onto the bushing 112 and clamped against the side plate 10, the ears prevent the slotted cylinder forming the body of the bushing 112, from collapsing. It is important to have this means to prevent the collapsing of the cylinder, since the cylinder in the region of the slots is discontinuous and, thereby, structurally weakened.

The tongue 118 is longer than that shown in the prior art and extends through, and in sliding engagement with, the tongue bushing 112. It is fastened at its upper end by the nut 22 to the button 20 in the same manner as in the prior art.

Figure 9:
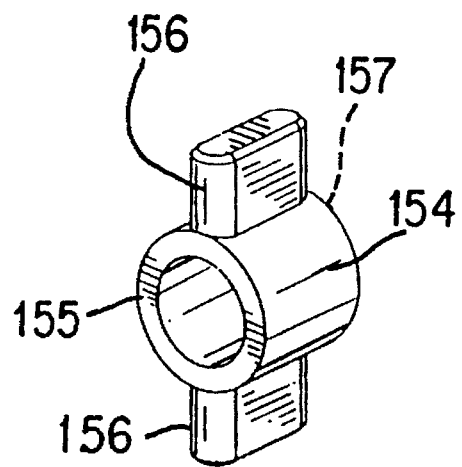
FIG. 9 is a reoriented perspective view of one of the parts of our invention shown in FIG. 4.
Figure 9A:
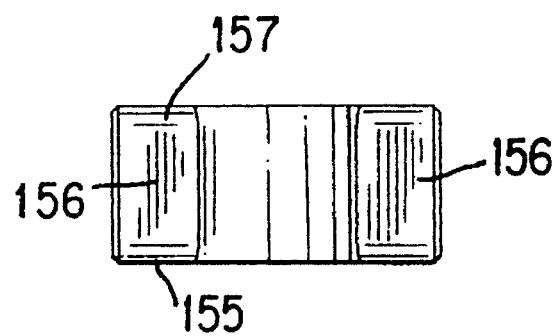
FIG. 9a is a elevation of the part shown in FIG. 9, which has been rotated to a side view and then reoriented 90 degrees clockwise.
Figure 9B:
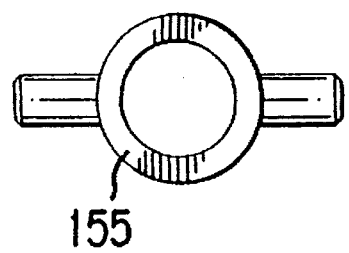
Figure 10:
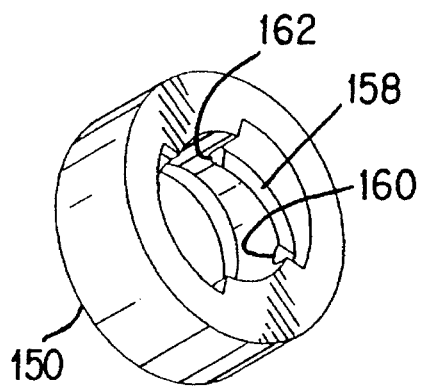
FIG. 10 is a reoriented perspective view of one of the parts shown in FIG. 4.
Figure 11:
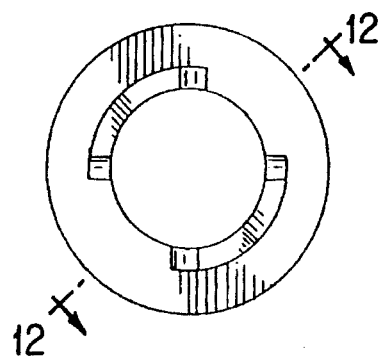
FIG. 11 is a bottom view of the part shown in FIG. 10.

The spring 126 is also longer than the spring in the prior art and rests against the shoulder 128 at one end and is compressed between that shoulder and the inner face 155 (FIG. 9) of the second cam follower 154. The outer face 157 (FIG. 9a) is a cam follower along those portions of the second cam follower ears 156, FIG. 9a and FIG. 9. These cam followers follow the cam surfaces 158, FIG. 12, of the free floating second cam 150, FIGS. 10 through 13. A second cam high detent 160 is provided at the inner end of the sloped surface 158 and a second cam low detent 162 is provided at the outer end of the free floating second cam's surfaces 158, (the function of which will be described hereinafter). The outer surfaces 157 of the follower ride along the cam surface 158 and are ultimately positioned in either the detents 160 or 162.

The second cam follower 154 has a cylindrical portion, as shown, which is in sliding fit within the cylindrical portion of the tongue bushing 112. The ears 156 extend through the slots 144.

Figure 12:
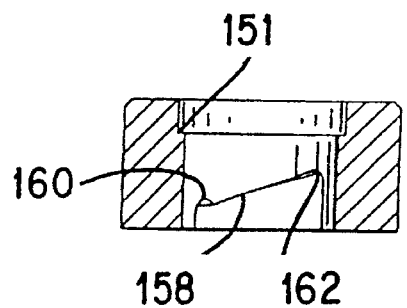
FIG. 12 is a section taken as indicated by the lines and arrows A—A in FIG. 11.
Figure 13:
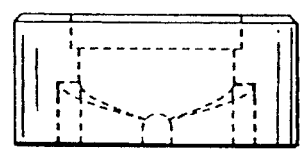
FIG. 13 is a vertical elevation of the part shown in FIG. 11.

The outer face of the free floating second cam 150 is counter-bored to form a recessed shoulder 151, shown in section FIG. 12. This recessed shoulder is engaged by the outer shoulder 113 of the tongue bushing 112, FIG. 5.

The hole 166 in the end plate 10 is not only recessed as shown by the counter-bore designated generally 167 to form a area to accommodate the outer diameter of the free floating second cam 150, but also includes outwardly extending detents designated generally 168 to accommodate clearance of the second cam follower ears 156 which pass therethrough. By this arrangement the portion of the side plate 10 which forms the slotted clearance spaces 168, prevents the rotation of the second cam follower 154, since the ears 156 will engage the side plate 10 within the slots 168 if torsion is applied to part 154.

In operation, the device functions as follows to provide variable high and low clicking noises on rotation of the spool holding the line being played out from the reel, as well to provide variable breaking on the spool.

Figure 14:
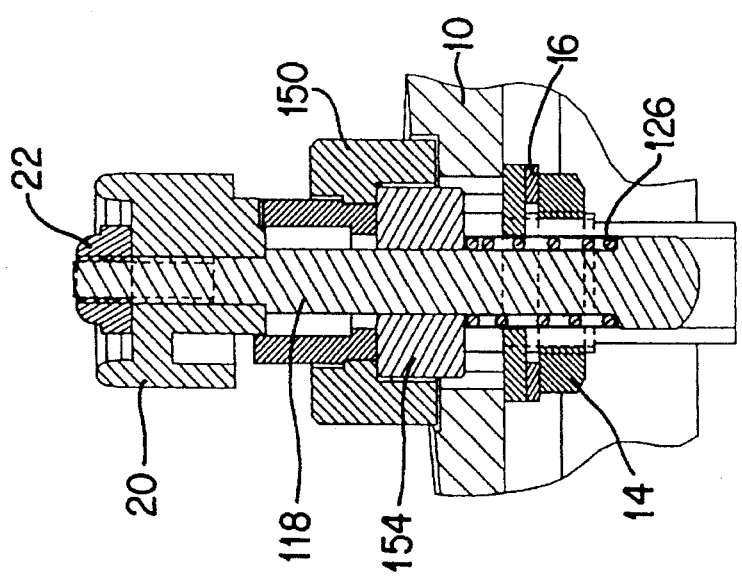
FIG. 14 is a vertical section of the parts shown in FIG. 4.
Figure 17:
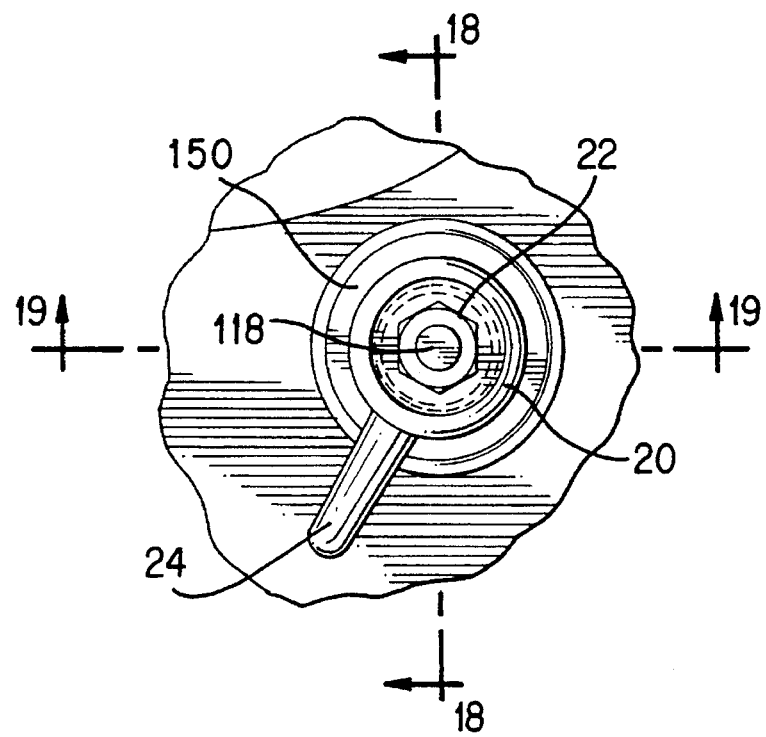
FIG. 17 is a partial top view of the parts as shown in FIG. 4; when assembled.

FIGS. 14 through 19 show various positions of our device in operation. Referring first to FIG. 14, the device is shown in a position similar to prior art FIG. 1, wherein the tongue 118 is retracted and does not engage any slot 35 in the ratchet 36. In this position the click mechanism is "off".

Figure 15:
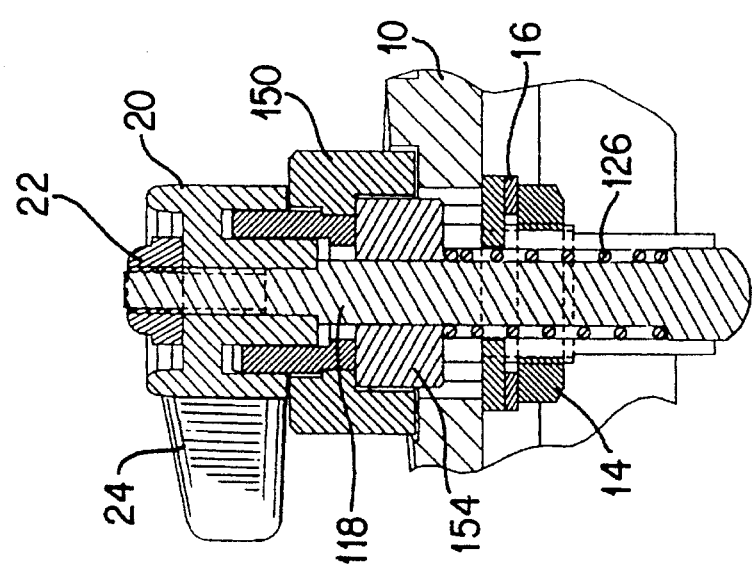
FIG. 15 is a vertical section similar to the section shown in FIG. 14; with the parts reoriented.
Figure 18:
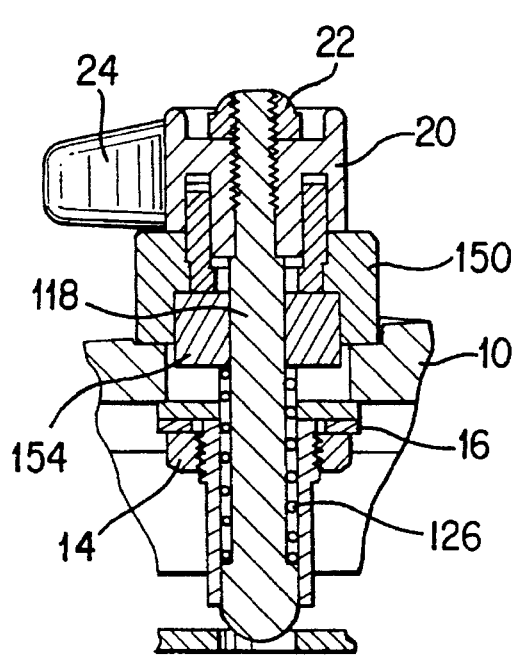
FIG. 18 is a section of the parts taken as indicated by the lines and arrows A—A in FIG. 17, partially broken away.
Figure 19:
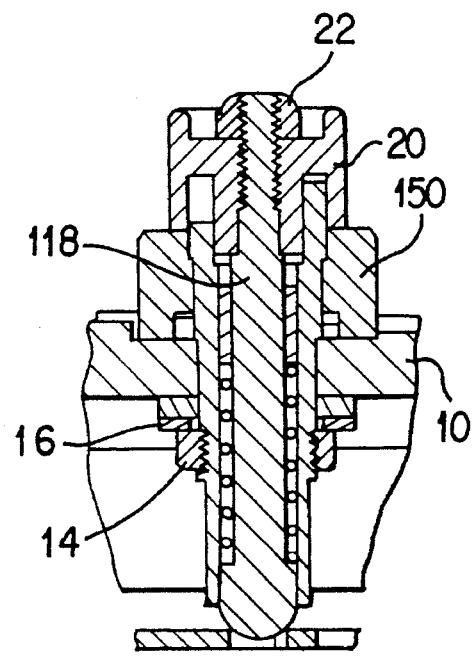
FIG. 19 is a section taken as indicated by lines and arrows B—B in FIG. 17.

In FIGS. 15, 18 and 19, the device is positioned in the "low" click position, in which the leading end of the tongue 118 does engage one of the slots 35 and impinges against the outer surface 42 of the ratchet 36 as that ratchet turns with the reel spool (not shown, but conventional per se) and exerts a force thereon to retard the playing out of the line. This low position is achieved by rotating the lever handle 24 of the button 20. Upon this rotation, the cam follower 34 moves out of the first detent 38 on the tongue bushing 112 and follows the outer surface 32 of that tongue bushing as the spring 126 forces the tongue 118 from the bushing. As the ratchet 36 turns, there is a chattering noise made, since the tongue will be lifted out of the slot 35, ride along the ratchet and drop into the next slot on a repetitive basis.

Figure 16:
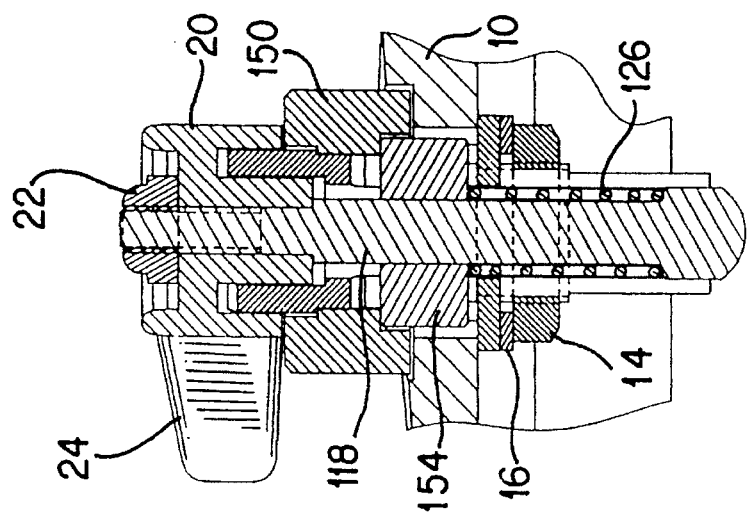
FIG. 16 is a vertical section similar to FIGS. 14 and 15; with the parts further reoriented.

In order to increase the force on the ratchet plate 36 as well as increase the intensity of the noise created by the clicking mechanism, we have provided another setting, known as "high" setting. The high click setting is shown in FIG. 16. This is created by rotating the free floating second cam 150; which most desirably has a knurled outer surface so it can be grasped by the thumb and forefinger of a fisherman. Rotation of this part about its axis causes the surfaces 158, FIG. 12, to drive against the outer follower surfaces 157 of the ears 156, thereby driving that part 154 inwardly of the reel. The part is retained from rotating because the ears 156 are in the slots 144 of the click bushing 112 and thus the second cam follower 154 is driven axially against the spring 126 which rests on the shoulder 128. This drives the tongue 118 harder against the surface 42 of the ratchet 36, that is it exerts more force on that surface. The part 150 is held in that position because the ears 156 engage the second cam high detents 160 in the free floating second cam 150.

FIGS. 20 through 23 show a further embodiment of our invention which allows for a range of settings as well as an infinite number of settings between the high and low ends of that range. While the basic functioning of the mechanism is similar to what has been described, the adjusting cam and cam follower have been replaced by threaded parts. In particular, the free floating second cam 150 now has been replaced by the part 250 shown in FIG. 22 and has an internal cylindrically threaded portion designated generally 222 in FIG. 22 (rather than the internal cam surfaces previously described).

Figure 23:
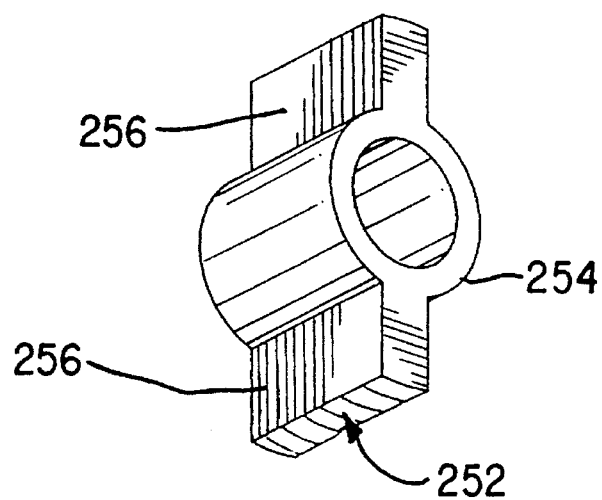
FIG. 23 is an enlarged perspective view of a portion of the device shown in FIG. 20.

The cam follower 154 has been replaced by an adjustable follower 254 FIG. 23 which has threads designated generally 252 on the outer surfaces of the ears 256. The parts are still positioned in relatively the same configuration except that the threads mate, so that when the part 250 is rotated, part 254 moves axially (see FIG. 20).

This arrangement provides an endless variety of adjustments within the range of travel dictated by the dimensions of the parts.

Figure 20:
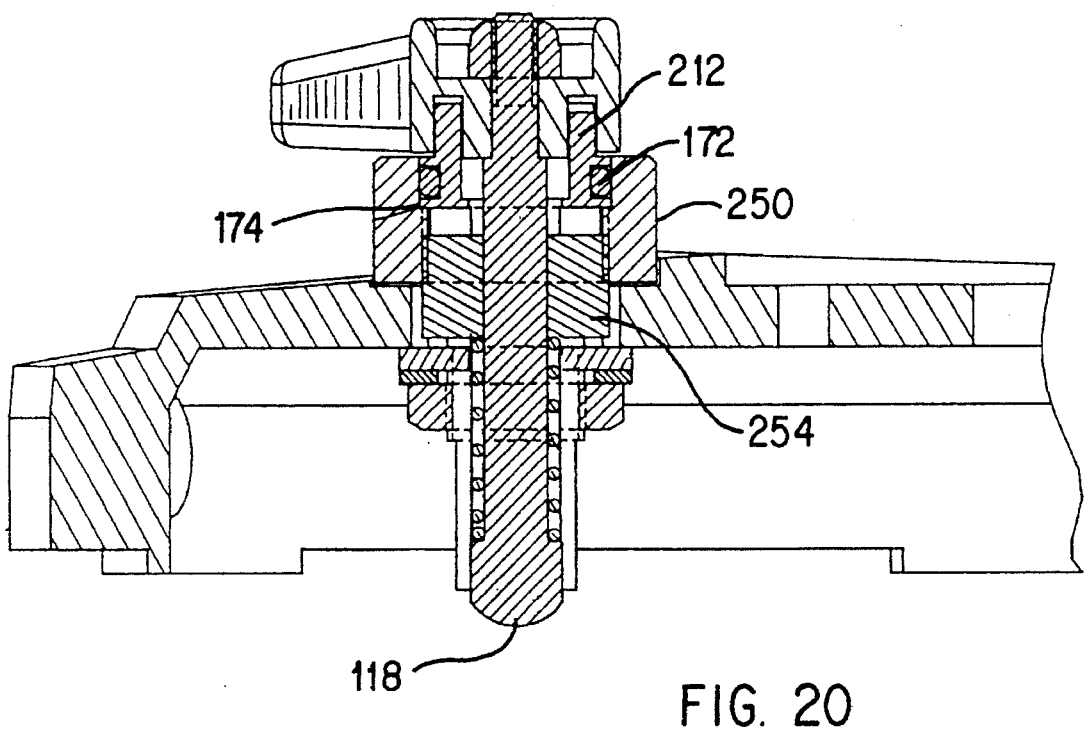
FIG. 20 is a vertical section of the device in accordance with an alternate embodiment of our invention.
Figure 21:
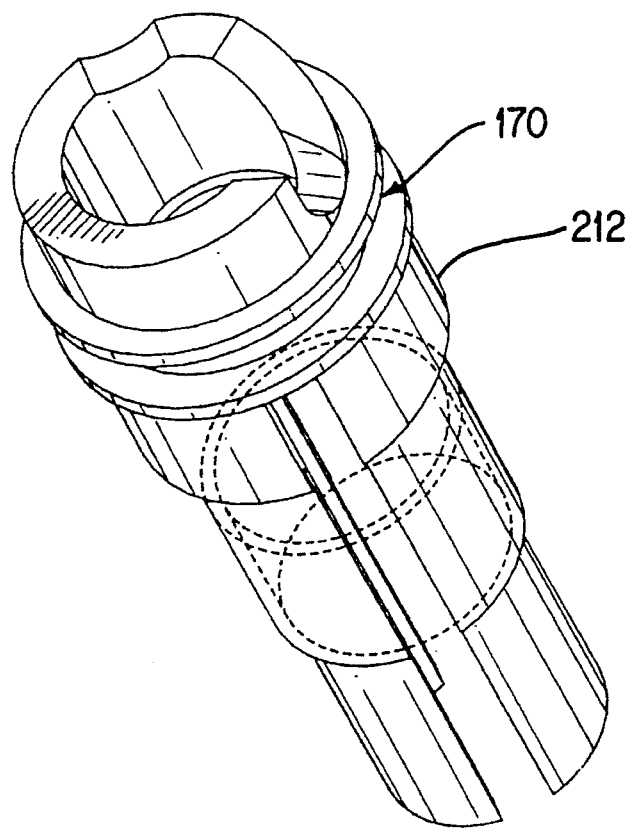
FIG. 21 is an enlarged perspective view of a portion of the device shown in FIG. 20.
Figure 22:
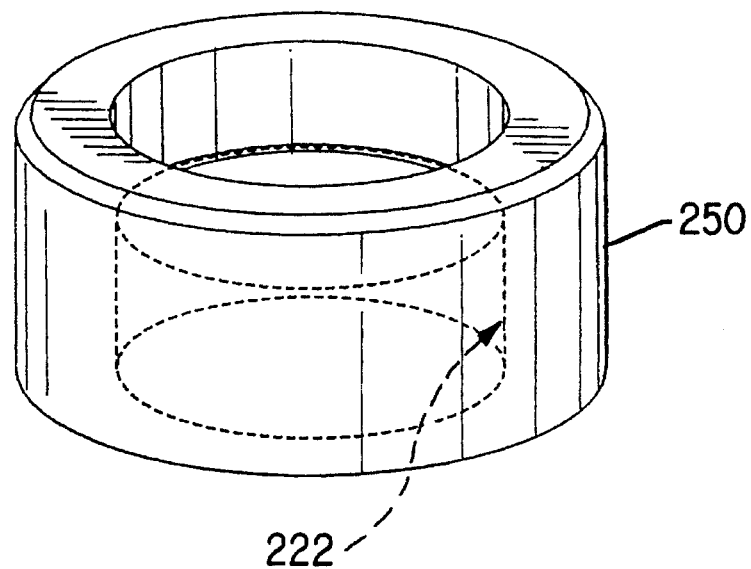
FIG. 22 is an enlarged perspective view of a portion of the device shown in FIG. 20.

In order to maintain the parts in their adjusted positions, an "O" ring 172, FIG. 20, is compressed between the inner cylindrical wall 174 of the threaded adjusting nut 250, and the portion of the walls of the tongue bushing 212 which form an annular slot designated generally 170, FIG. 21. The compressed "O" ring exerts a frictional force to maintain the part 250 in position under the vibration caused by the constant movement of the tongue 118.

We claim:

1. In a reel, having sides embracing a spool and a click mechanism mounted through one of said sides to exert a drag on said spool when it is rotated, an improved click means for providing independent adjustment to vary the drag created by said click mechanism against said reel and vary the resulting noise created by said click mechanism, comprising:

a. a hollow, generally cylindrical bushing having axially extending slots therein, retaining a spring and a tongue in sliding engagement for intermittently engaging detents in a ratchet which rotates with said spool; said bushing, tongue and spring being in engagement with one another so that said click mechanism makes said noise and provides said drag on said spool in response to the force exerted by said spring on said tongue when said spool is rotated;

b. means engaged with and coacting with said spring, tongue and bushing for moving said tongue between a first position wherein said tongue does not engage said ratchet and a second position wherein said tongue engages said ratchet; and c. means for varying the spring force applied by said tongue against said ratchet in said second position, comprising: a manually operable cam means in sliding engagement with said bushing and having cam surfaces thereon; and cam follower means having a generally cylindrical body portion in sliding engagement within said hollow portion of said bushing, and ear portions extending outwardly in planes parallel to the axis of said cylindrical body portion, said ear portions extending into and being in sliding engagement with said axially extending slots and engaged with said spring and positioned to engage and follow said cam surfaces to force said tongue into engagement with said ratchet depending on the position of said cam followers on said cam surfaces.

2. The invention of claim 1 wherein said side through which said click mechanism is mounted is provided with a hole and said bushing is in sliding engagement with said hole; and said side is further provided with slots communicating with said hole, said slots providing a means whereby said outwardly extending ear portions of said cam follower may pass through said sides and prevent rotation of said cam follower means.

3. The invention of claim 1 wherein means are provided to engage said bushing and fixedly retain it in engagement with said side through which said click mechanism is mounted, comprising: a threaded surface on the exterior of said bushing; a nut; and a washer having ears extending inwardly toward the axis of said bushing and positioned within said slots.

4. In a reel, having sides embracing a spool and a click mechanism mounted through one of said sides to exert a drag on said spool when it is rotated, an improved click means for providing independent adjustment to vary the drag created by said click mechanism against said reel and vary the resulting noise created by said click mechanism; comprising:

a. a bushing retaining a spring and a tongue in sliding engagement for intermittently engaging detents in a ratchet which rotates with said spool; said bushing, tongue and spring being in engagement with one another so that said click mechanism makes said noise and provides said drag on said spool in response to the force exerted by said spring on said tongue when said spool is rotated;

b. means engaged with and coacting with said spring, tongue and bushing for moving said tongue between a first position wherein said tongue does not engage said ratchet and a second position wherein said tongue engages said ratchet; and c. means for varying the spring force applied by said tongue against said ratchet in said second position, comprising: a manually operable cam means in sliding engagement with said bushing and having cam surfaces thereon; and cam follower means in sliding engagement with said bushing and engaged with said spring and positioned to engage and follow said cam surfaces to force said tongue into engagement with said ratchet depending on the position of said cam followers on said cam surfaces, said cam means further comprising a cam with said cam surfaces having detents therein to engage said cam follower means in a plurality of fixed positions.

5. In a reel, having sides embracing a spool and a click mechanism mounted through one of said sides to exert a drag on said spool when it is rotated, an improved click means for providing independent adjustment to vary the drag created by said click mechanism against said reel and vary the resulting noise created by said click mechanism, comprising:

a. bushing retaining a spring and a tongue in sliding engagement for intermittently engaging detents in a ratchet which rotates with said spool; said bushing, tongue and spring being in engagement with one another so that said click mechanism makes said noise and provides said drag on said spool in response to the force exerted by said spring on said tongue when said spool is rotated;

b. means engaged with and coacting with said spring, tongue and bushing for moving said tongue between a first position wherein said tongue does not engage said ratchet and a second position wherein said tongue engages said ratchet; and c. means for varying the spring force applied by said tongue against said ratchet in said second position, comprising a threaded adjustment nut and threaded follower in threaded engagement therewith.

6. In a reel, having sides embracing a spool and a click mechanism mounted through one of said sides to exert a drag on said spool when it is rotated, an improved click means for providing independent adjustment to vary the drag created by said click mechanism against said reel and vary the resulting noise created by said click mechanism, comprising:

a. a bushing retaining a spring and a tongue in sliding engagement for intermittently engaging detents in a ratchet which rotates with said spool; said bushing, tongue and spring being in engagement with one another so that said click mechanism makes said noise and provides said drag on said spool in response to the force exerted by said spring on said tongue when said spool is rotated;

b. means engaged with and coacting with said spring, tongue and bushing for moving said tongue between a first position wherein said tongue does not engage said ratchet and a second position wherein said tongue engages said ratchet; and c. means for varying the spring force applied by said tongue against said ratchet in said second position, comprising: a manually operable cam means in engagement with said bushing and having cam surfaces thereon; and cam follower means engaged with said spring and positioned to engage and follow said cam surfaces to force said tongue into engagement with said ratchet depending on the position of said cam followers on said cam surfaces; and further comprising a threaded adjustment nut and threaded follower in threaded engagement therewith.

7. The invention of claim 5 or 6 wherein said bushing is generally cylindrical and hollow and has axially extending slots therein and said cam follower means has a generally cylindrical body portion in sliding engagement within said hollow portion of said bushing, and ear portions extending outwardly in planes parallel to the axis of said cylindrical body portion, said ear portions extending into and being in sliding engagement with said axially extending slots.

8. In a reel, having sides embracing a spool and a click mechanism mounted through one of said sides to exert a drag on said spool when it is rotated, an improved click means for providing independent adjustment to selectively vary the drag created by said click mechanism against said reel and vary the resulting noise created by said click mechanism, comprising:

a. means retaining a spring and a tongue for intermittent engagement with a ratchet which rotates with said spool; said tongue and spring being in engagement with one another so that said click mechanism makes said noise and provides said drag on said spool in response to the force exerted by said spring on said tongue when said spool is rotated;

b. means engaged with and coacting with said spring and tongue for moving said tongue between a first position wherein said tongue does not engage said ratchet and a second position wherein said tongue engages said ratchet; and c. independent means for selectively pre-setting the spring force applied by said tongue against said ratchet, to maximum, minimum and intermediate levels.

9. The invention of claim 8 wherein the independent means for selectively pre-setting the spring force comprises a threaded adjustment nut and threaded follower in threaded engagement therewith.

10. The invention of claim 9 wherein said means retaining a spring and a tongue comprises a hollow, generally cylindrical bushing having axially extending slots therein and said follower has a generally cylindrical body portion in sliding engagement within said hollow portion of said bushing, and ear portions extending outwardly in planes parallel to the axis of said cylindrical body portion, said ear portions extending into and being in sliding engagement with said axially extending slots.

11. The invention of claim 10 wherein said threaded follower has a generally cylindrical body portion in sliding engagement with the hollow portion of said bushing and ears extending from said body portion in sliding engagement with said slots.

12. The invention of claim 11 wherein said means to inhibit slippage is an "O" ring.

13. The invention of claim 10 wherein the threaded adjustment nut has a generally cylindrical hole therethrough through which the generally cylindrical bushing passes in sliding engagement therewith; and means are provided engaging the threaded adjustment nut and the bushing to inhibit slippage therebetween.

14. The invention of claim 10 wherein means are provided to engage said bushing and fixedly retain it in engagement with said side through which said click mechanism is mounted, comprising: a threaded surface on the exterior of said bushing; a nut; and a washer having ears extending inwardly toward the axis of said bushing and positioned within said slots.

* * * * *